US008255885B2

(12) United States Patent
Zeidman

(10) Patent No.: US 8,255,885 B2
(45) Date of Patent: Aug. 28, 2012

(54) DETECTING COPIED COMPUTER SOURCE CODE BY EXAMINING COMPUTER OBJECT CODE

(75) Inventor: Robert Zeidman, Cupertino, CA (US)

(73) Assignee: Software Analysis and Forensic Engineering Corp., Cupertino, CA (US)

( * ) Notice: Subject to any disclaimer, the term of this patent is extended or adjusted under 35 U.S.C. 154(b) by 1059 days.

(21) Appl. No.: 12/214,128

(22) Filed: Jun. 16, 2008

(65) Prior Publication Data

US 2009/0313271 A1 Dec. 17, 2009

(51) Int. Cl.
*G06F 9/45* (2006.01)
(52) U.S. Cl. .................. 717/136; 717/137; 717/146
(58) Field of Classification Search .......... 717/136–161
See application file for complete search history.

(56) References Cited

U.S. PATENT DOCUMENTS

| | | | |
|---|---|---|---|
| 5,627,748 A * | 5/1997 | Baker et al. .................. 715/210 |
| 5,752,039 A | 5/1998 | Tanimura |
| 5,946,484 A | 8/1999 | Brandes |
| 6,282,698 B1 * | 8/2001 | Baker et al. .................. 717/118 |
| 6,658,421 B1 | 12/2003 | Seshadri |
| 6,877,156 B2 | 4/2005 | Osborne et al. |
| 6,886,156 B2 | 4/2005 | McCormack |
| 7,681,045 B2 * | 3/2010 | Pedersen et al. ............. 713/190 |
| 2002/0010907 A1 | 1/2002 | MacCormack |
| 2002/0046398 A1 | 4/2002 | Osborne et al. |
| 2005/0114840 A1 * | 5/2005 | Zeidman ...................... 717/126 |
| 2006/0005166 A1 * | 1/2006 | Atkin et al. .................. 717/120 |

OTHER PUBLICATIONS

Ducasse et al., A Language Independent Approach for Detecting Duplicated Code, aquired from http://www.cse.yorku.ca/course_archive/2004-05/F/6431/ResearchPapers/Rieger.pdf, 1999, IEEE, pp. 1-10.*
Lyon, C. Barrett, R., and Malcolm, J. (2006). Plagiarism Is Easy, But Also Easy to Detect. Plagiary: Cross-Disciplinary Studies in Plagiarism, Fabrication, and Falsification, pp. 57-65.*
Jeong-Hoon Ji et al., A Source Code Linearization Technique for Detecting Plagiarized Programs, 2007 ACM, pp. 73-77.*
Aiken, A., Moss, "A System for Detecting Software Plagiarism," 1998 http://www.cs.berkeley.edu/~aiken/moss.html Accessed Aug. 22, 2003, 1998 (2 pgs.).
Clough, Paul, "Plagiarism in Natural and Programming Languages: an Overview of Current Tools and Technologies", Department of Computer Science, University of Sheffield, UK, Jun. 2000, (31 pgs.) http://www1.compaq.com/pressrelease/0,1494,wp%7E14583_2!ob%7E29892_1_1.00.html.
Gray, Andrew, et al., "IDENTIFIED (Integrated Dictionary-based Extraction of Non-language-dependent Token Information for Forensic Identification, Examination, and Discrimination): A Dictionary-based System for Extracting Source Code Metrics for Software Forensics", Department of Information Science, University of Otago, New Zealand (8 pgs.).
Gray, Andrew, et al., "Software Forensics: Extending Authorship Analysis Techniques to Computer Programs", Department of Information Science, University of Otago, New Zealand (8 pgs.).

(Continued)

*Primary Examiner* — Anna Deng
*Assistant Examiner* — Satish Rampuria
(74) *Attorney, Agent, or Firm* — Blakely, Sokoloff, Taylor & Zafman LLP

(57) ABSTRACT

Methods and systems for detecting copied program code are described. The detection may be performed by comparing source code of a first program to object code of a second program. Alternatively, the detection may be performed by comparing object code of a first program to object code of a second program.

20 Claims, 8 Drawing Sheets

OTHER PUBLICATIONS

Melski, David PhD., "Improving Reliability and Security by Analyzing Executables", Clip&Copy, Embedded Computing Design, Apr. 15, 2008, (5 pgs.).

Prechelt, Lutz, et al., "Finding Plagiarisms among a Set of Programs with JPlag", Journal of Universal Computer Science, vol. 8, No, 11, (2002), pp. 1016-1038 (23 pgs.).

"Plagiarism Detection—YAP" (2 pgs.).

Schulman, Andrew, "Finding Binary Clones with Opstrings & Function Digests", Part I, Dr. Dobb's Journal, Jun. 3, 2005, (7 pgs.).

Schulman, Andrew, "Finding Binary Clones with Opstrings & Function Digests", Part II, Dr. Dobb's Journal, Jul. 6, 2005, (7 pgs.).

Schulman, Andrew, "Finding Binary Clones with Opstrings & Function Digests", Part III, Dr. Dobb's Journal, Aug. 4, 2005, (9 pgs.).

Wise, Michael, "YAP3: Improved Detection of Similarities in Computer Program and Other Texts", presented at SIGCSE'96, Philadelphia, Feb. 15-17, 1996, pp. 130-134 (5 pgs.).

\* cited by examiner

```
void fdiv(
302         char *fname, // file name        300
            char *path)  // path
    {                         306
304     int j = 0;
        printf("begin \"routine\"");
        while( j == 0)
        {
            j = strlen(fname);    308
            printf("loop = %i\n", j);
        } j = strcmp(fname, "file1.txt");
```

Figure 3A

```
String[0] = "begin "routine""          340
String[1] = "loop = %i"
String[2] = "file1.txt"
```

Figure 3B

```
Identifier[0] = "fdiv"                 360
Identifier[1] = "fname"
Identifier[2] = "path"
```

Figure 3C

```
66646976  FF78FF79  FF7AFFFF  FFFFFFFF
62656769  6E202272  6F757469  6E652200
00000066  696C6531  2E747874  00010203
07086C6F  6F70203D  2025690D  0A0D0A00
```
                                    400

Figure 4A

```
fdiv‖x‖y‖z‖‖‖‖‖
Begin "routine"‖
‖‖‖file1.txt‖‖‖
‖‖loop = %i    ‖
```
                                    440

```
Text[0] = "fdiv"
Text[1] = "begin "routine""
Text[2] = "loop = %i\n"
Text[3] = "file1.txt"
```
                                    460

Figure 4C

DETECTING COPIED COMPUTER SOURCE CODE BY EXAMINING COMPUTER OBJECT CODE

RELATED APPLICATIONS

This application is related to U.S. patent application Ser. No. 10/720,636, filed on Nov. 25, 2003, which issued as U.S. Pat. No. 7,503,035 B2 on Mar. 10, 2009, and which is assigned to the assignee of the present application and hereby incorporated by reference.

TECHNICAL FIELD

Embodiments of the present invention relate to analyzing computer program code, and more specifically to detecting copied computer source code by examining computer object code.

BACKGROUND

Plagiarism detection programs and algorithms have been around for a number of years but have gotten more attention recently due to two main factors. Firstly, the Internet and search engines like Google have made source code very easy to obtain. Secondly, open source movement has grown tremendously over the past several years, allowing programmers all over the world to write, distribute, and share code.

In recent years, plagiarism detection techniques have become more sophisticated. A summary of available tools is given by Paul Clough in his paper entitled "Plagiarism in natural and programming languages: an overview of current tools and technologies." Clough discusses tools and algorithms for finding plagiarism in generic text documents as well as in programming language source code files.

There are a number of plagiarism detection programs currently available including the Plague program developed by Geoff Whale at the University of New South Wales, the YAP programs (YAP, YAP2, YAP3) developed by Michael Wise at the University of Sydney, Australia, the JPlag program, written by Lutz Prechelt and Guido Malpohl of the University Karlsruhe and Michael Philippsen of the University of Erlangen-Nuremberg, the Measure of Software Similarity (MOSS) program developed at the University of California at Berkeley by Alex Aiken, and the CodeMatch® program developed by the inventor of the present invention, Robert Zeidman.

A deficiency of the aforementioned programs is that they require source code for both programs to be compared. For most commercial software, source code is proprietary and highly guarded intellectual property of a company and is not available. Nor is the source code readily turned over to another party for comparison without a court order. Unavailability of a competitor's source code is a problem for companies that wish to determine whether their source code has been copied by a competitor.

Source code is typically compiled into electronic machine-readable ones and zeros ("bits" or "binary") that comprise object code, which is given to users to run on their computers or, in the case of software libraries, linked into other programs. Some conventional software analysis tools can assist in detecting copied code by comparing object code with source code using one of several methods. For example, one method involves "decompiling" object code into the higher level language in which the source code was originally written and then comparing two sets of source code. This method has a number of drawbacks. First, it is usually not known which programming language was originally used to develop the program and so decompiling it into a different programming language source code would yield poor results or in some cases unusable results if it can be done at all. Another drawback of this method is that even when the original programming language is known, in order to recreate something that looked like the original code, it would be necessary to have much more information such as the particular compiler program, the compiler version, the compiler settings, and the libraries that were used to compile the original source code into object code. The decompiling method rarely produces any usable results.

Another conventional method creates a detailed block diagram of the control flow or data flow of the executable program and compares this block diagram to the same kind of detailed block diagram of the executable program produced by compiling the source code to which it is to be compared. A drawback of this method is that the diagrams can be extremely complex. As a result, their comparison is typically very time consuming and is hard to automate.

Accordingly, it would be beneficial to have a plagiarism detection tool that can overcome the above limitations of the conventional techniques.

BRIEF DESCRIPTION OF THE DRAWINGS

The present invention is illustrated by way of example, and not by way of limitation, in the figures of the accompanying drawings and in which:

FIG. 3A illustrates a sample source code file;

FIG. 3B illustrates a sample string array created from a sample source code of FIG. 3A;

FIG. 3C illustrates a sample identifier array created from a sample source code of FIG. 3A;

FIG. 4A illustrates a sample object code file in hexadecimal format;

FIG. 4B illustrates a sample object code file of FIG. 4A in American Standard Code for Information Interchange ("ASCII") format;

FIG. 4C illustrates a sample text array created from a sample object code file of FIG. 4A;

DETAILED DESCRIPTION

Figure 1:
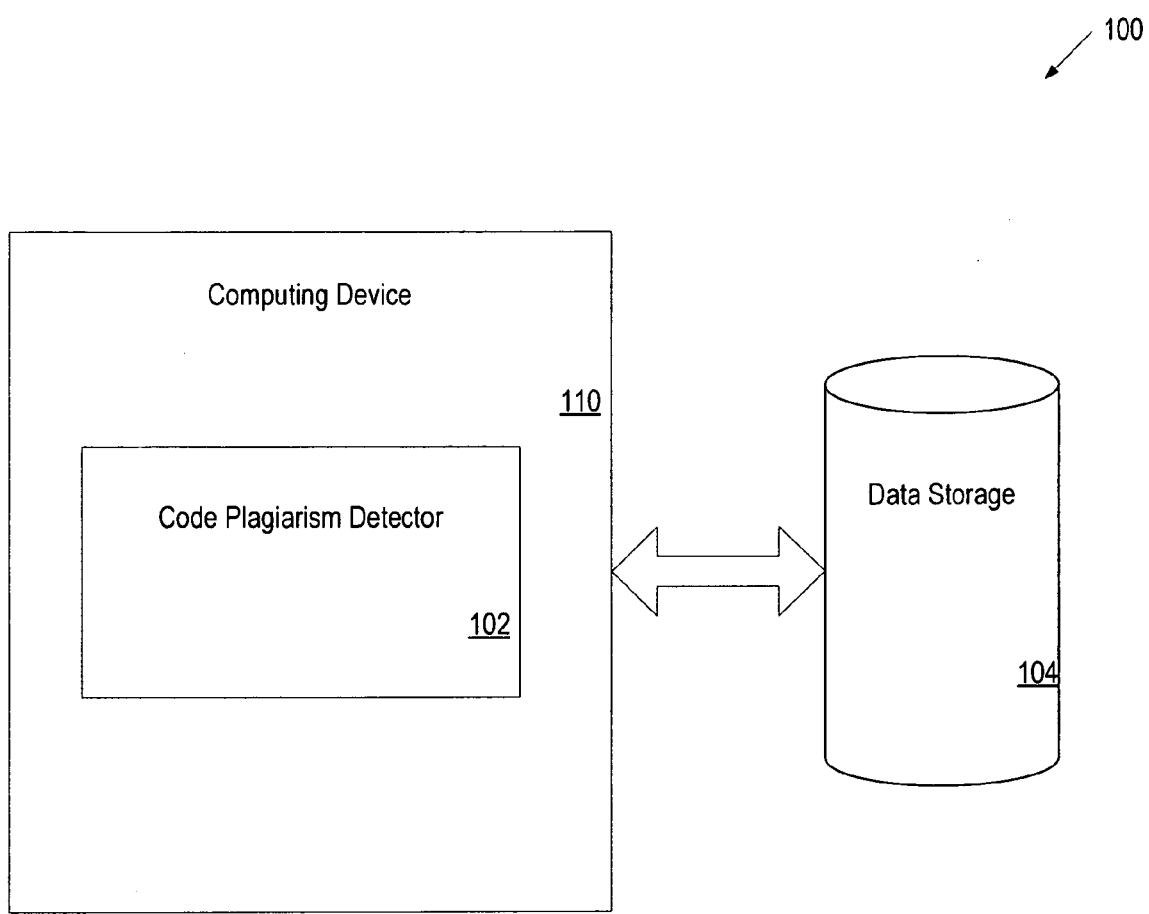
FIG. 1 illustrates a block diagram of a system for detecting program code plagiarism, in accordance with one embodiment of the invention.

Methods and systems for detecting copied program code based on object code are described. In one embodiment, signs of possible copying are detected by comparing source code of an original program with object code of a third party program.

In another embodiment, signs of possible copying are detected by comparing object code of an original program with object code of a third party program.

Embodiments of the invention make use of a basic knowledge of programming languages and program structures to simplify the matching task, while requiring a small amount of programming language-specific information. Such programming language-specific information may include, for example, common programming language keywords, characters used to delimit strings in the particular programming language, or special characters and character sequences that represent non-printable characters or other characters.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "communicating", "executing", "passing", "determining", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.), etc.

FIG. 1 illustrates a block diagram of a system 100 for detecting program code plagiarism, in accordance with one embodiment of the invention. The system 100 includes a computing device 110 and a data storage device 104. The data storage device 104 may be a mass storage device, such as a magnetic or optical storage based disk or tape, and may be part of the computing device 110, or be coupled with the computing device 110 directly or via a network (e.g., a public network such as the Internet or a private network such as a local area network (LAN)). The computing device 110 may be a personal computer (PC), palm-sized computing device, personal digital assistant (PDA), server, or other computing device.

The computer device 110 hosts a code plagiarism detector 102 that can detect plagiarism by examining object code of a program. In one embodiment, the code plagiarism detector 102 detects plagiarism by comparing a computer program source code file with a computer program object code file. Alternatively, the code plagiarism detector 102 detects plagiarism by comparing two computer program object files. The files being compared may be stored in the data storage device 104.

In one embodiment, the code plagiarism detector 102 preprocesses the files being compared prior to performing the comparison. As will be discussed in more detail below, the code plagiarism detector 102 may create data structures (e.g., arrays) for the files being compared, and may store the data structures in the data storage 104. The code plagiarism detector 102 may then compare entries of the data structures, and calculate a correlation score based on the number of similar entries in the data structures, where the correlation score indicates the likelihood of plagiarism. The code plagiarism detector 102 may generate a similarity report and store it in the data storage 104 or display it to a user of the computing device 110 or some other computing device coupled to the device 110 (e.g., directly or via a network).

Figure 2A:
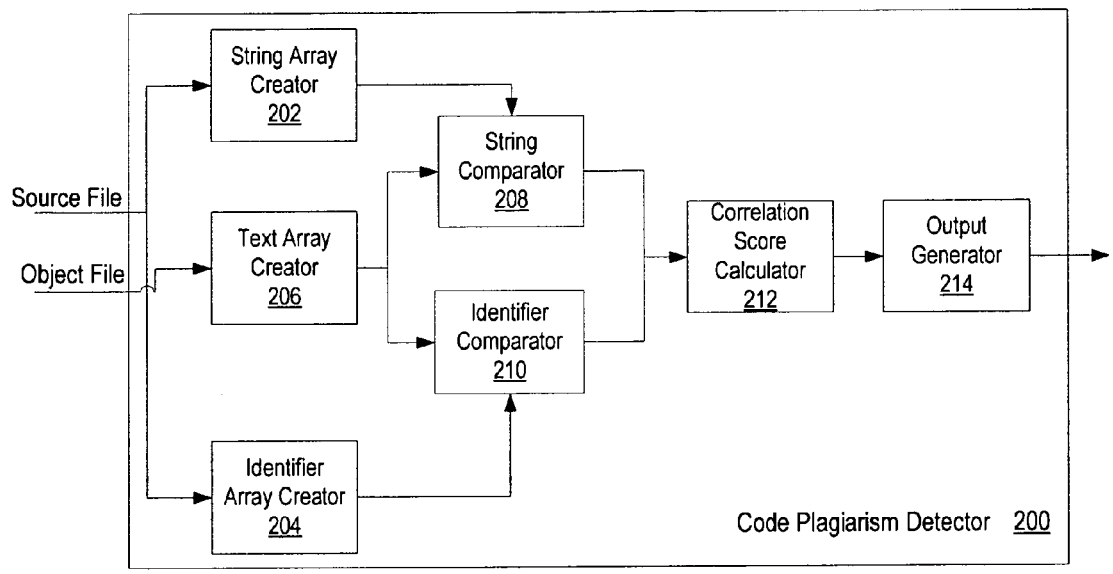
FIG. 2A illustrates a block diagram of a code plagiarism detector, in accordance with one embodiment of the invention.

FIG. 2A illustrates a block diagram of one embodiment of a code plagiarism detector 200 that compares a source code file of a first program with an object code file of a second program. The code plagiarism detector 200 includes array creators 202, 204 and 206, a string comparator 208, an identifier comparator 210, a correlation score calculator 212, and an output generator 214.

The string array creator 202 and identifier array creator 204 examine lines of the source code file and create a string array and an identifier array respectively. The string array includes strings that are found in the source code. Strings may, for example, represent messages that are displayed to a user on a computer monitor or other output device at various times and under various conditions. The identifier array includes identifiers found in the source code. Identifiers may be variable names, constant names, function names, and any other words that are not keywords of the programming language.

FIGS. 3A, 3B and 3C illustrate the creation of exemplary arrays for a source code file, in accordance with one embodiment of the invention. In particular, FIG. 3A illustrates a snippet of a sample source code file 300, FIG. 3B illustrates an exemplary string array 340 created from the source code file 300, and FIG. 3C illustrates an exemplary identifier array 360 created from the source code file 300.

The string array creator 202 of FIG. 2A uses a predefined list of special characters, which is programming language specific, to correctly construct the string array (e.g., the string array 340). For example, the source code file 300 includes double quote characters that are used code to delimit strings, a special character sequence (\") 306 that represents a single double quote character, and a special character sequence (\n) 308 that represents a non-printable character sequence (carriage return and linefeed). Based on the relevant list of special characters, the string array creator 202 replaces the sequence 306 with the double quote character in the array 340, and refrains from including the sequence 308 in the array 340.

The identifier array 360 includes identifiers found in the source code file 300. The identifier array creator 204 of FIG. 2A recognizes programming language keywords and does not include them in the identifier array 360. For example, printf 304 is recognized as a programming language keyword and is not included in the identifier array 360. In one embodiment, the identifier array creator 204 does not include 1-character identifiers (e.g., identifier j) in the identifier array 360 because it considers 1-character identifiers too common. In alternative embodiments, 2-character identifiers are ignored. Yet alternative embodiments have other minimum character requirements for identifiers, or have other criteria for ignoring identifiers that would otherwise be too common and produce less useful results.

Referring to FIG. 2A, the text array creator 206 examines the object code file and creates a text array. The text array includes the longest consecutive sequences of printable characters found in the object code file.

FIGS. 4A, 4B and 4C illustrate the creation of an exemplary array for an object code file, in accordance with one embodiment of the invention. In particular, FIG. 4A illustrates a snippet of a sample object code file 400 in hexadecimal format, FIG. 4B illustrates an ASCII view 440 of the object code file 400, and FIG. 4C illustrates a sample text array 460 created from the object code file 400.

Each non-printable ASCII character and each non-ASCII character is shown as a special symbol. Based on the object code file 400, the text array creator 204 creates a sample text array 460. In one embodiment, the text array creator 204 ignores 1-character sequences because they are too common to consider and often occur by chance (e.g., text sequences 'x', 'y', and 'z' 442 are not included in the array 460). In alternative embodiments, 2-character text sequences are ignored. Yet alternative embodiments have other minimum character sequence requirements for text, or have other criteria for ignoring text sequences that would otherwise be too common and produce less useful results.

Referring to FIG. 2A, once the array creators 202, 204 and 206 create their respective arrays, the string comparator 208 and identifier comparator 210 perform the comparison using these arrays. The string comparator 208 compares each entry in the string array to the entries in the text array. Strings often represent messages that are displayed to a user on a computer monitor or other output device at various times and under various conditions. Hence, a copied code would display the same messages or very similar messages to the user.

This string comparator 208 calculates a number of similar strings. In one embodiment, similar strings consist of exact matches. In other words, the number of matching strings includes only strings and text sequences where each and every character in the string exactly matches the corresponding character in the text sequence. For example, number s can represent the number of matching strings in the pair of arrays and can be determined using the following equation:

$$s = \Sigma A_i \text{ for } i=1 \text{ to } m_s$$

where $m_s$ is the number of matching strings in the two arrays and $A_i$ is the number of matching characters in matching string i.

In another embodiment, similar strings are not limited to exact matches and also include partial matches. It may be that in the object code, the string is buried in a long sequence of text characters that include other strings. Hence, this other embodiment considers partial matches where a string can be found in its entirety within a longer sequence of characters. Similarly, copied source code may have been modified during later development, or to hide its origins, and so strings in the source code may be similar but not identical to text sequences found in the object code. Thus, this other embodiment considers partial matches where a string and a text sequence have a common sequence of characters even though the entire sequence of characters in the string and in the text sequence is not identical.

The identifier comparator 210 compares each identifier in the identifier array of the source code file with every text sequence in the text array of the object code file. In some programming languages like C and Java, identifiers are case sensitive. In other programming languages like Basic, identifiers are not case sensitive. In one embodiment, when comparing identifiers in the file pairs, case is ignored so that the identifier "Index" in one file would be matched with the identifier "index" in the other. This case-insensitive comparison overcomes instances where case changes were made to copied code in an attempt to avoid detection.

When source code is compiled, most of the identifier names are removed from the resulting object code because identifier names are used by programmers to simply keep track of data locations and instruction locations in the source code. However, when data structures or routines are exported (i.e., made available for use by other programs), the identifier names are often maintained in the object code to allow other programs to use these data structures and instruction routines by simply referencing their given names. Therefore, the identifier comparator 210 can find matches between source code files and object code files if copying has occurred.

The identifier comparator 210 calculates a number of similar identifiers. In one embodiment, similar identifiers consist of exact matches. In other words, the number of matching identifiers includes only identifiers and text sequences where each and every character in the identifier exactly matches the corresponding character in the text sequence. For example, number w can represent the number of matching identifiers in the pair of arrays and can be determined using the following equation:

$$w=\Sigma(A_i+f_N N_i) \text{ for } i=l \text{ to } m_w$$

where $m_w$ is the number of case-insensitive matching identifiers in the two arrays, $A_i$ is the number of matching non-numeric characters in matching identifier i, $N_i$ is the number of matching numerals in matching identifier i, and $f_N$ is a fractional value given to matching numerals in a matching identifier. The reason for this fractional value is that alphabetical characters are less likely to match by chance, but numerals may match simply because they represent common mathematical constants—the value of pi for example—rather than because of copying. Longer sequences of letters and/or numerals have a smaller probability of matching by chance and therefore deserve more consideration as potential copying. For certain programming languages and certain applications, $f_N$ may be equal to 1.

The object code may include an identifier that is buried in a long sequence of text characters that include other identifiers. Thus, in another embodiment, similar identifiers are not limited to exact matches and also include partial matches. That is, the identifier comparator 210 considers partial matches where an identifier can be found in its entirety within a longer sequence of characters. Similarly, copied source code may have been modified during later development, or to hide its origins, and so identifiers in the source code may be similar but not identical to text sequences found in the object code. Thus, this other embodiment would consider partial matches where an identifier and a text sequence have a common sequence of characters even though the entire sequence of characters in the identifier and in the text sequence is not identical.

The correlation score calculator 212 combines the results of the string comparator 208 and the identifier comparator 210 into a correlation score. The correlation score is a measure of the similarity of the file pairs. In one embodiment, if a file pair has a higher score, it means that these files are more correlated and the object code file may be the result of having been generated from a source code file that was copied from the compared source code file. In one embodiment, the correlation score is calculated using the following equation:

$$t=k_w w+k_s s$$

In this equation, the results produced by the string comparator 208 and the identifier comparator 210 are weighted and added to give a total matching score. These weights must be adjusted to give the optimal results. In one embodiment, the above equation also depends on weight $f_N$, the fractional value given to matching numerals in a matching identifier, as discussed above. Thus, the weights that may need to be adjusted to produce a useful total matching score may include $f_N$, the fractional value given to matching numerals in a matching identifier, $k_w$, the weight given to the identifier matching algorithm, and $k_s$, the weight given to the string matching algorithm. In one embodiment, these weights are adjusted by experimentation over time to give the best results.

Alternative embodiments use other ways of combining the results of the string comparator 208 and the identifier comparator 210, including using a sum of squares or an average or a maximum. The scores may also be normalized such that the correlation score is between 0 and 1 inclusive or between 0 and 100 inclusive. In one embodiment, a higher correlation score (i.e., more matching strings and identifiers) means a more likely possibility of copying and further analysis is warranted. This further analysis may entail obtaining the source code that was used to generate the object code files and performing a comparison of source code files to source code files. If no matching strings or identifiers are found, this does not enable the user to draw any particular conclusion. It is still possible that copying occurred and further analysis may be needed. The higher correlation score may indicate a possibility that copying occurred but it may not prove that copying did not occur.

The output generator 214 generates an output such as a report that may include a list of file pairs ordered by their total correlation scores, as will be discussed in more detail below.

Figure 2B:
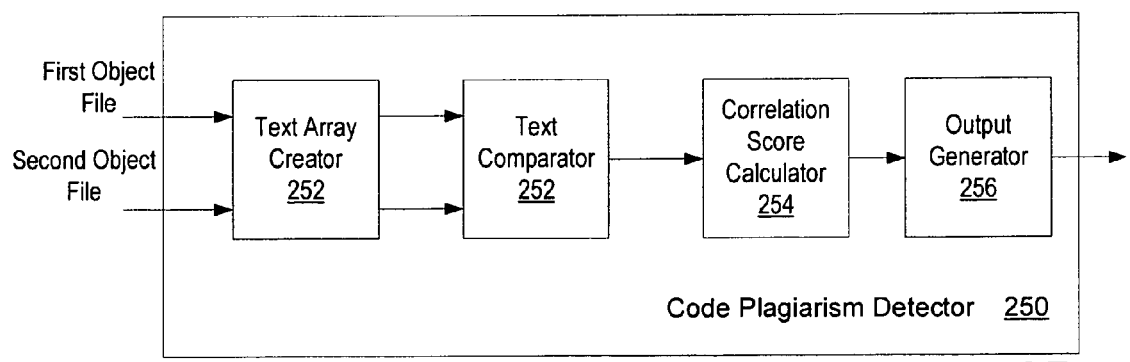
FIG. 2B illustrates a block diagram of a code plagiarism detector, in accordance with another embodiment of the invention.

FIG. 2B illustrates a block diagram of a code plagiarism detector 250, in accordance with another embodiment of the invention. The code plagiarism detector 250 compares an object code file of a first program (first object code file) with an object file of a second program (second object code file). The code plagiarism detector 250 can be used by a company that wishes to detect possible source code copying by a competitor and assigns that task to a third party company but does not wish to release its proprietary source code to that third party company.

The code plagiarism detector 250 includes a text array creator 252, a text comparator 252, a correlation score calculator 254, and an output generator 256. The text array creator 252 creates a text array for each object code file, similarly to the text array creator 204 of FIG. 2A. The text comparator 252 compares text sequences in the two arrays and calculates a number of similar text sequences. In one embodiment, the text comparator 252 also calculates the number of matching numerals in the similar text sequences and the number of matching non-numeric characters in the similar text sequences. In one embodiment, similar text sequences only consist of exact matches. Alternatively, similar text sequences also include partial matches.

The correlation score calculator 254 calculates a correlation score for the two files. In one embodiment, the correlation score is calculated using the following equation:

$$t=\Sigma(A_i+f_N N_i) \text{ for } i=l \text{ to } m_t$$

where $m_t$ is the number of case-insensitive matching text sequences in the two files, $A_i$ is the number of matching non-numeric characters in matching text sequence i, $N_i$ is the number of matching numerals in matching text sequence i, and $f_N$ is a fractional value given to matching numerals in a matching identifier. For certain programming languages and certain applications, $f_N$ may be equal to 1.

The output generator 256 generates an output such as a report that may include a list of file pairs ordered by their total correlation scores, as will be discussed in more detail below.

Although code plagiarism detectors 200 and 250 were discussed above as utilizing ASCII text sequences, they may use various other mechanisms to represent text with binary numbers including Unicode and EBCDIC. One of ordinary skill in the art would recognize how to adapt the discussed embodiments for use with other binary representations of text.

Figure 5:
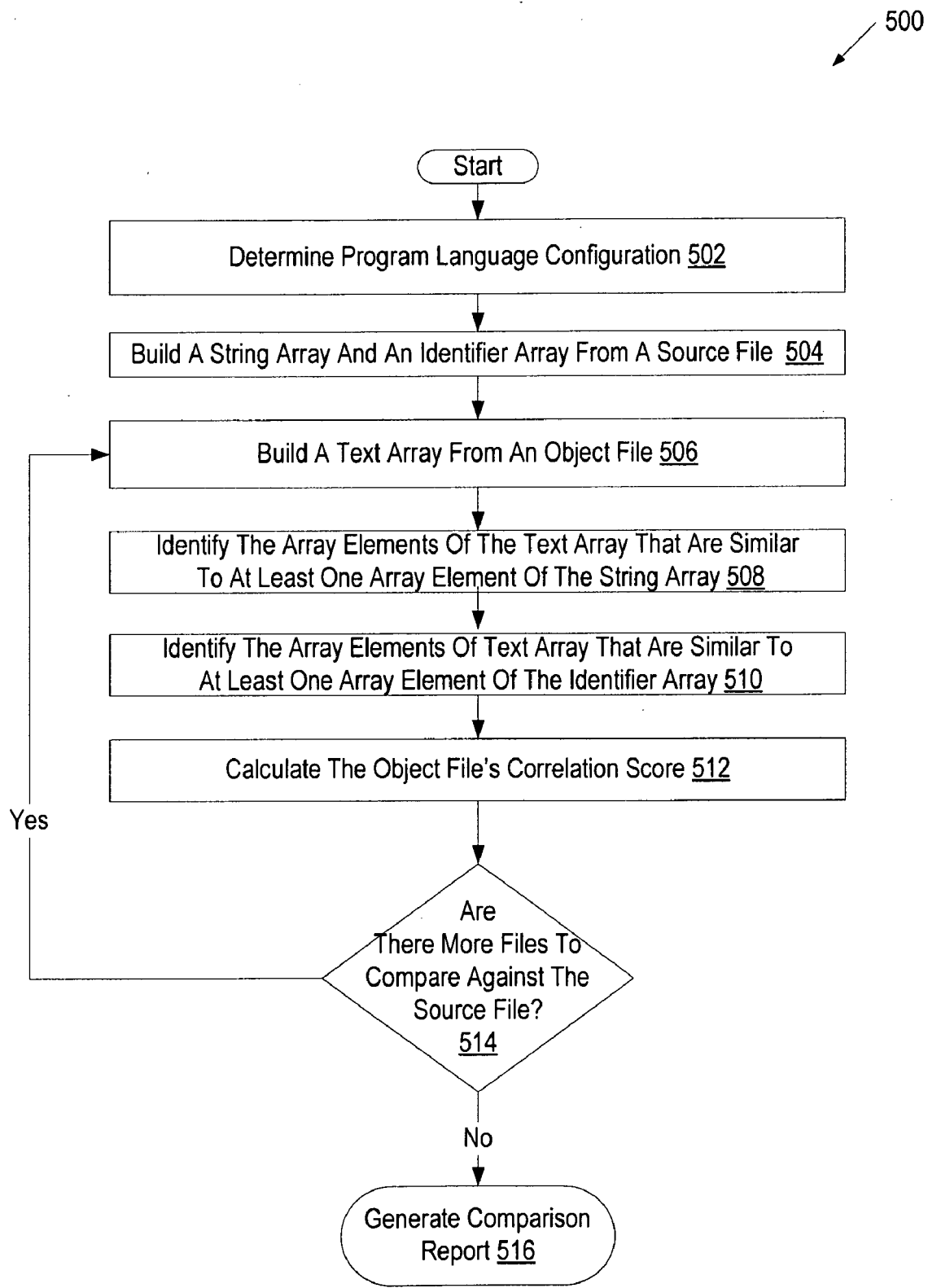
FIG. 5 illustrates a flow diagram of one embodiment for a method of detecting code plagiarism.

FIG. 5 illustrates a flow diagram of one embodiment for a method 500 of detecting code plagiarism. The method may be performed by processing logic that may comprise hardware (e.g., circuitry, programmable logic, microcode, etc.), software (such as instructions run on a processing device), or a combination thereof. In one embodiment, the method 500 is performed by a code plagiarism detector (e.g., code plagiarism detector 200 of FIG. 2A).

Referring to FIG. 5, method 500 begins with processing logic determining program language dependant information (block 502). Program language dependant information may include, for example, string delimiters, special characters and character sequences, and a list of keywords. Program language dependant information may be hard-coded or provided by a user.

At block 504, processing logic creates a string array and an identifier array for a source code file of a first program. Processing logic creates the above arrays using the program language dependant information. At block 506, processing logic creates a text array for an object code file of a second program.

At block 508, processing logic compares the string array of the source code file and the text array of the object code file, and creates a list of similar strings. At block 510, processing logic compares the identifier arrays of the source code file and the text array of the object code file, and creates a list of similar identifiers.

At block 512, processing logic combines the numbers of similar strings and the number of similar identifiers to generate a correlation score. At block 514, processing logic determines whether there are more object code files that need to be compared against the source object file. If so, processing logic proceeds to block 506. If not, processing logic proceeds to block 516. At block 516, processing logic generates a report based on the comparison.

Figure 6:
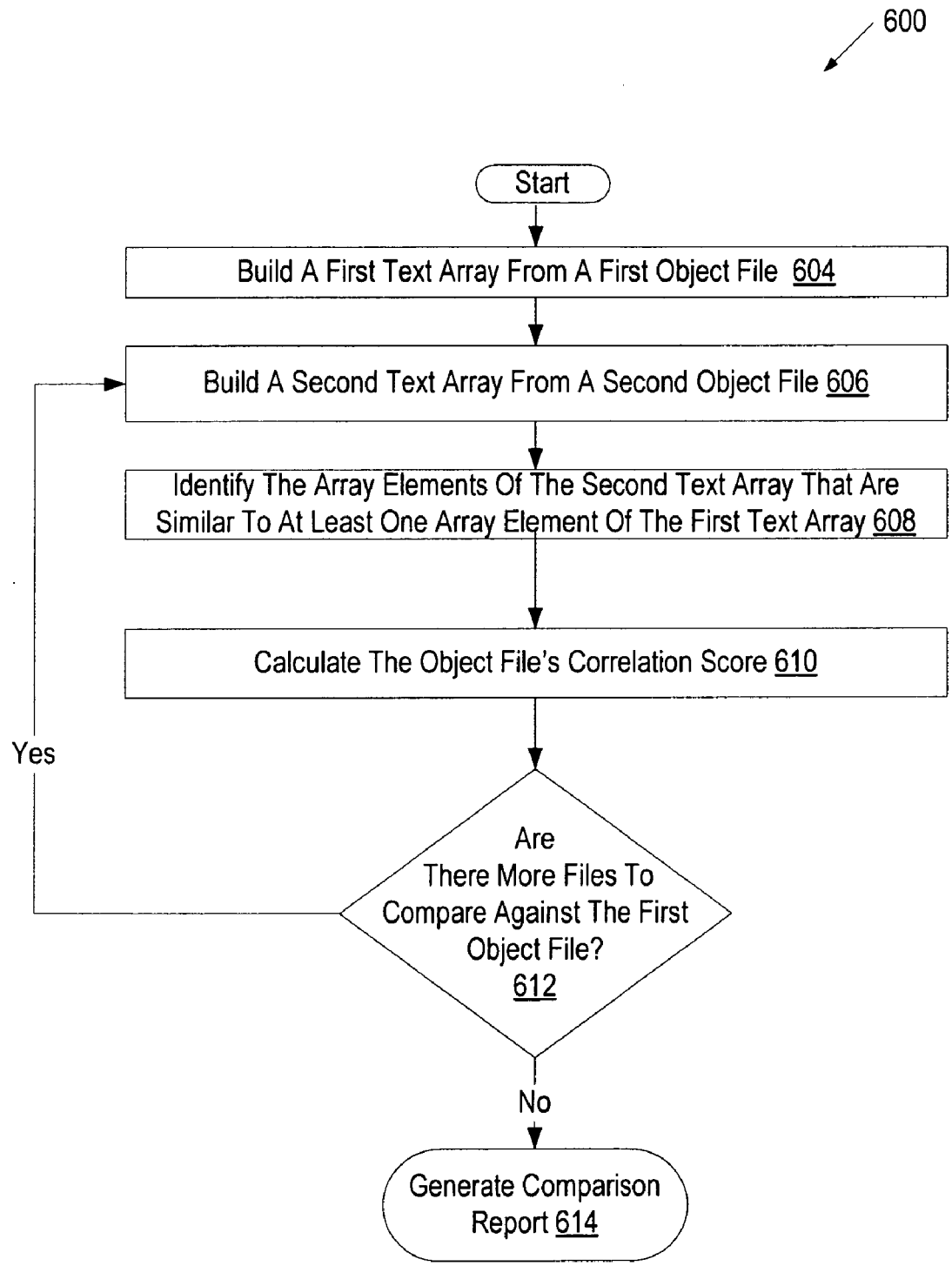
FIG. 6 illustrates a flow diagram of another embodiment for a method of detecting code plagiarism.

FIG. 6 illustrates a flow diagram of another embodiment for a method 600 of detecting code plagiarism. The method may be performed by processing logic that may comprise hardware (e.g., circuitry, programmable logic, microcode, etc.), software (such as instructions run on a processing device), or a combination thereof. In one embodiment, the method 600 is performed by a code plagiarism detector (e.g., code plagiarism detector 250 of FIG. 2B).

Referring to FIG. 6, method 600 begins with processing logic creating a first text array for an object code file of a first program (block 604). At block 606, processing logic creates a second text array for an object code file of a second program. Processing logic creates the above arrays using the program language dependant information.

At block 608, processing logic compares the two text arrays, and creates a list of similar text array elements. At block 610, processing logic generates a correlation score for the two object code files. At block 612, processing logic determines whether there are more object code files that need to be compared against the first object code file. If so, processing logic proceeds to block 606. If not, processing logic proceeds to block 614. At block 614, processing logic generates a report based on the comparison.

Figure 7A:
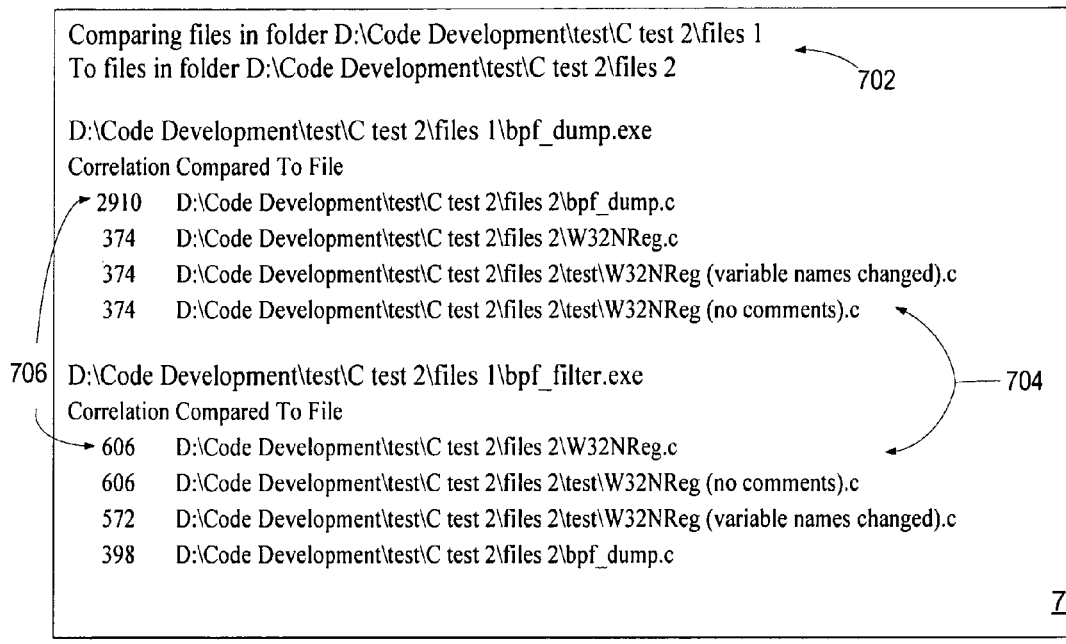
FIG. 7A illustrates a sample report indicating possible plagiarism.
Figure 7B:
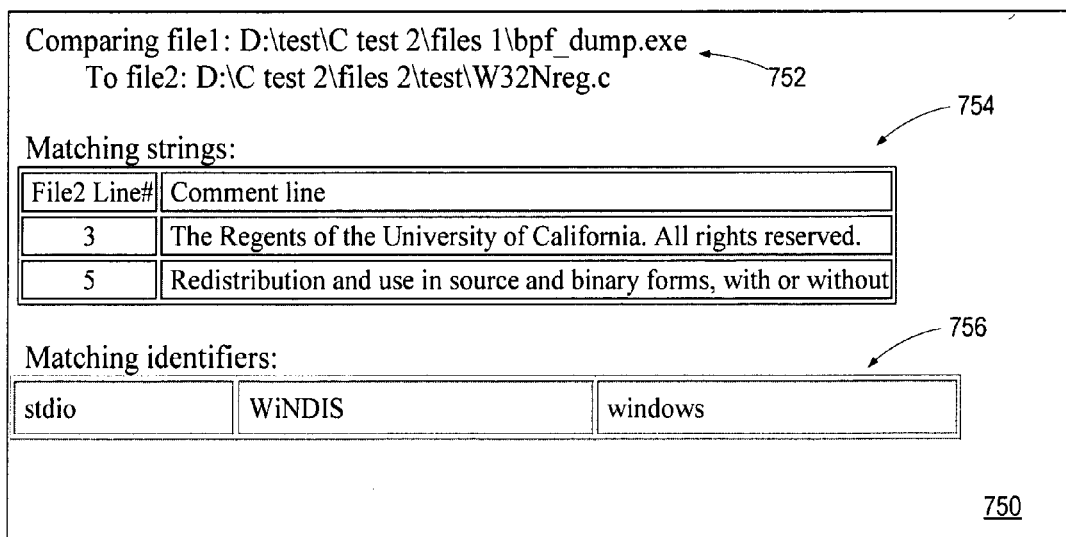
FIG. 7B illustrates another sample report indicating possible plagiarism.

FIGS. 7A and 7B illustrate sample online reports indicating possible plagiarism. Referring to FIG. 7A, an HTML output report 700 includes a list of file pairs ordered by their total correlation scores. The report 700 includes a header 702 and a ranking of file pair matches 704 based on their correlation scores. Each correlation score 706 is also a hyperlink to a more detailed report for that particular file pair.

FIG. 7B illustrates a detailed report 750 showing exact matches between the selected file pairs. In this way, experts are directed to suspicious similarities and allowed to make their own judgments. The detailed report 750 includes a header 752 that tells which files are being compared. Furthermore, the detailed report includes a detailed description of the matching strings 754 and a detailed description of the matching identifiers 756.

Figure 8:
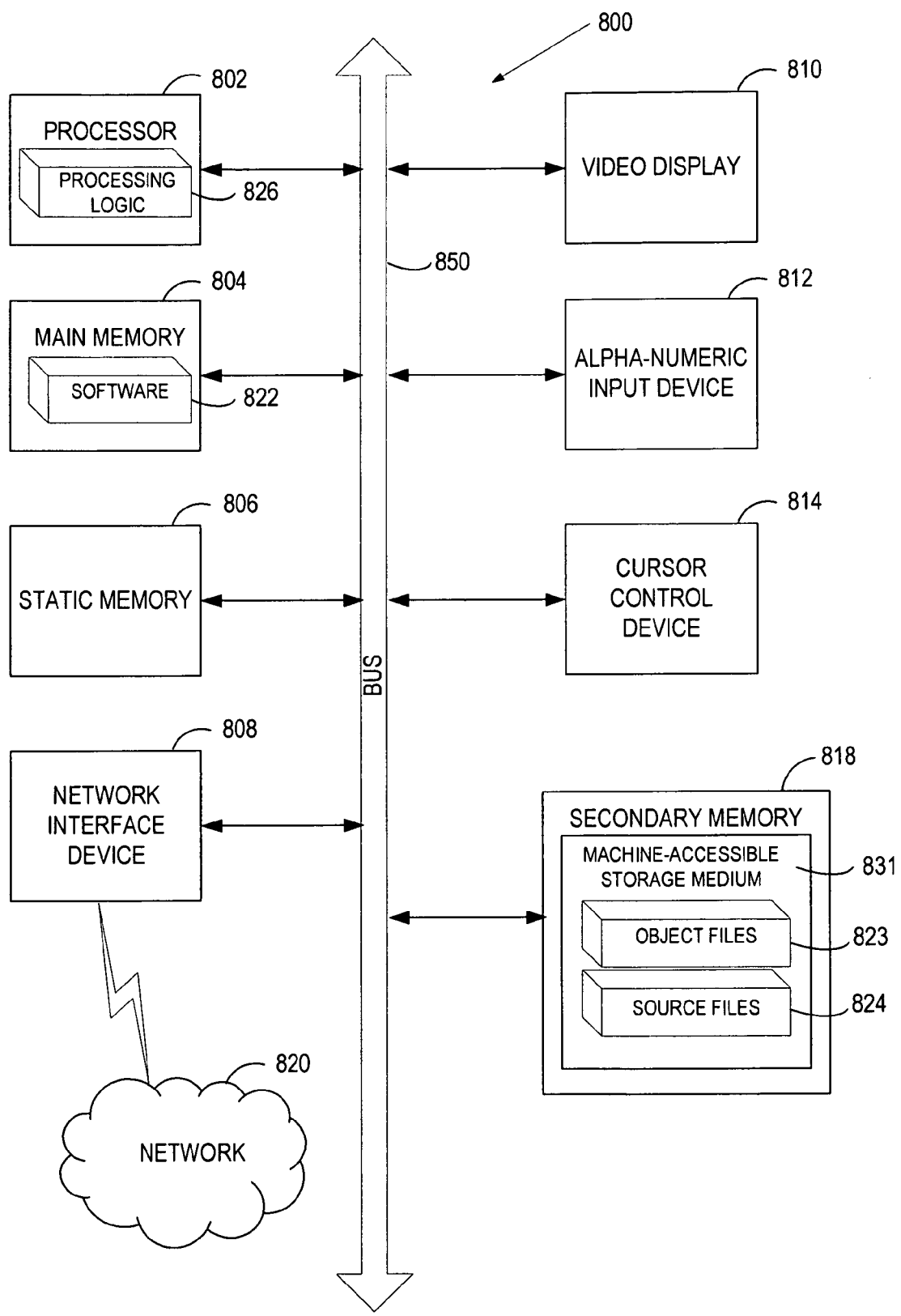
FIG. 8 illustrates a block diagram of an exemplary computer system, in accordance with one embodiment of the invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 850.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), and a cursor control device 814 (e.g., a mouse).

The secondary memory 818 may include a machine-readable storage medium (or more specifically a computer-readable storage medium) 831 on which is stored one or more sets of instructions embodying any one or more of the methodologies or functions described herein. The software 822 may reside, completely or at least partially, within the main memory 804 and/or within the processing device 802 during execution thereof by the computer system 800, the main memory 804 and the processing device 802 also constituting machine-readable storage media. The software 822 may further be transmitted or received over a network 820 via the network interface device 808.

The machine-readable storage medium 831 may also be used to store object files 823, and/or source files 824. While the machine-readable storage medium 831 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

I claim:

1. A computer-implemented method comprising:
    creating one or more first data structures based on a program source code file including a plurality of program elements, each of the first data structures having entries corresponding to program elements of a distinct program element type represented by program strings or program identifiers;
    creating a second data structure based on a program object code file using a text converter to convert the program object code to text sequences by solely determining byte by byte whether byte sequences represent characters, the second data structure having entries corresponding to the text sequences from the program object code file;
    comparing the entries of the first data structures with the entries of the second data structure to find similar entries;
    calculating a correlation score based on the similar entries; and
    presenting to a user an indication of copying with respect to the program source code file and the program object code file, wherein the indication of copying is defined by the correlation score.

2. The method of claim 1 wherein creating one or more first data structures based on a program source code file comprises:
    creating, based on program language dependent information, a third data structure including a plurality of strings from the program source code file; and
    creating, based on the program language dependent information, a fourth data structure including a plurality of identifiers from the program source file.

3. The method of claim 2 wherein comparing the entries of the first data structures with the entries of the second data structure comprises:
    comparing entries of the third data structure with the entries of the second data structure, each of the entries of the second data structure being a sequence of contiguous text characters from the program object code file; and
    comparing entries of the fourth data structure with the entries of the second data structure.

4. The method of claim 3 wherein calculating a correlation score based on the similar entries comprises:
    calculating a number of similar strings based on the comparison between the entries of the third data structure and the entries of the second data structure;
    calculating a number of similar identifiers based on the comparison between the entries of the fourth data structure and the entries of the second data structure; and
    combining the number of similar strings with the number of similar identifiers to produce the correlation score.

5. The method of claim 4 wherein the number of similar strings and the number of similar identifiers are combined using corresponding weights.

6. The method of claim 1 wherein providing an indication of copying with respect to the program source code file and the program object code file comprises:
    presenting a report identifying the program source code file and the program object code file, and the correlation score calculated based on the comparison; and allowing a user to select the correlation score to view the similar entries.

7. The method of claim 1 wherein:
    the similar entries represent at least one of exact matches and partial matches.

8. The method of claim 1 wherein:
    the comparison is insensitive to whether characters in the data structures are uppercase or lowercase.

9. The method of claim 1 wherein presenting to a user an indication of copying with respect to the program source code file and the program object code file comprises:
    displaying a report identifying the program source code file and the program object code file, and the correlation score calculated based on the comparison; and
    allowing a user to select the correlation score to view the similar entries.

10. A computer-implemented method comprising:
    creating a first data structure based on a first program object code file using a text converter to convert the first program object code to text sequences by solely determining byte by byte whether byte sequences represent characters, the first data structure containing a plurality of entries to store the text sequences from the first program object code, wherein the text sequences from the first program object code corresponds to object code elements;
    creating a second data structure based on a second program object code file using the text converter to convert the second program object code to text sequences by solely determining byte by byte whether byte sequences represent characters, the second data structure containing a plurality of entries to store the text sequences from the second program object code, wherein the text sequences from the second program object code corresponds to object code elements;
    comparing the entries of the first data structure with the entries of the second data structure to find similar entries;
    calculating a correlation score based on the similar entries; and
    presenting to a user an indication of copying with respect to the first program object code file and the second program object code file, wherein the indication of copying is defined by the correlation score.

11. The method of claim 10 wherein each entry in the first data structure is a sequence of contiguous text characters from the first program object code file, and each entry in the second data structure is a sequence of contiguous text characters from the second program object code file.

12. The method of claim 10 wherein calculating a correlation score based on the similar entries comprises:
    calculating a number of matching non-numeric characters in the similar entries;
    calculating a number of matching numerals in the similar entries; and combining the number of matching non-numeric characters with a fraction of the number of matching numerals to produce the correlation score.

13. The method of claim 12 wherein the fraction of the number of matching numerals varies between 0 and 1 inclusive.

14. The method of claim 10 wherein:
the similar entries represent at least one of exact matches and partial matches.

15. The method of claim 10 wherein:
the comparison is insensitive to whether characters in the data structures are uppercase or lowercase.

16. The method of claim 10 wherein presenting to a user an indication of copying with respect to the first program object code file and the second program object code file comprises:
displaying a report identifying the first program object code file and the second program object code file, and the correlation score calculated based on the comparison; and
allowing a user to select the correlation score to view the similar entries.

17. A non-transitory computer-readable storage medium storing executable instructions to cause a computer system to perform a method comprising:
creating one or more first data structures based on a program source code file including a plurality of program elements, each of the first data structures having entries corresponding to program elements of a distinct program element type represented by program strings or program identifiers;
creating a second data structure based on a program object code file using a text converter to convert the program object code to text sequences by solely determining byte by byte whether byte sequences represent characters, the second data structure having entries corresponding to the text sequences from the program object code file;
comparing the entries of the first data structures with the entries of the second data structure to find similar entries;
calculating a correlation score based on the similar entries; and
providing an indication of copying with respect to the program source code file and the program object code file, wherein the indication of copying is defined by the correlation score.

18. A non-transitory computer-readable storage medium storing executable instructions to cause a computer system to perform a method comprising:
creating a first data structure based on a first program object code file using a text converter to convert the first program object code to text sequences by solely determining byte by byte whether byte sequences represent characters, the first data structure containing a plurality of entries to store the text sequences from the first program object code, wherein the text sequences from the first program object code corresponds to object code elements;
creating a second data structure based on a second program object code file using a text converter to convert the second program object code to text sequences by solely determining byte by byte whether byte sequences represent characters, the second data structure containing a plurality of entries to store the text sequences from the second program object code, wherein the text sequences from the second program object code corresponds to object code elements;
comparing the entries of the first data structure with the entries of the second data structure to find similar entries; and
calculating a correlation score based on the similar entries, the correlation score providing an indication of copying with respect to the first program object code file and the second program object code file.

19. An apparatus comprising:
a memory storing instructions; and
a processor to execute the instructions and cause the apparatus to
create one or more first data structures based on a program source code file including a plurality of program elements, each of the first data structures having entries corresponding to program elements of a distinct program element type represented by program strings or program identifiers;
create a second data structure based on a program object code file using a text converter to convert the program object code to text sequences by solely determining byte by byte whether byte sequences represent characters, the second data structure having entries corresponding to the text sequences from the program object code file;
compare the entries of the first data structures with the entries of the second data structure to find similar entries;
calculate a correlation score based on the similar entries; and
provide an indication of copying with respect to the program source code file and the program object code file, wherein the indication of copying is defined by the correlation score.

20. An apparatus comprising:
a memory storing instructions; and
a processor to execute the instructions and cause the apparatus to
create a first data structure based on a first program object code file using a text converter to convert the first program object code to text sequences by solely determining byte by byte whether byte sequences represent characters, the first data structure containing a plurality of entries to store the text sequences from the first program object code, wherein the text sequences from the first program object code corresponds to object code elements, and to create a second data structure based on a second program object code file using a text converter to convert the second program object code to text sequences by solely determining byte by byte whether byte sequences represent characters, the second data structure containing a plurality of entries to store the text sequences from the second program object code, wherein the text sequences from the second program object code corresponds to object code elements;
compare the entries of the first data structure with the entries of the second data structure to find similar entries; and
calculate a correlation score based on the similar entries, the correlation score providing an indication of copying with respect to the first program object code file and the second program object code file.

* * * * *